United States Patent
Krishnan et al.

(10) Patent No.: US 10,183,623 B2
(45) Date of Patent: Jan. 22, 2019

(54) TAILGATE ASSEMBLY WITH DEPLOYABLE CANTILEVERED STEP

(71) Applicant: FORD GLOBAL TECHNOLOGIES, LLC, Dearborn, MI (US)

(72) Inventors: Venkatesh Krishnan, Canton, MI (US); Thomas Michael Herline, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 15/256,895

(22) Filed: Sep. 6, 2016

(65) Prior Publication Data

US 2018/0065560 A1    Mar. 8, 2018

(51) Int. Cl.
*B60R 3/02* (2006.01)

(52) U.S. Cl.
CPC ........................ *B60R 3/02* (2013.01)

(58) Field of Classification Search
CPC ........................................................ B60R 3/02
See application file for complete search history.

(56) References Cited

U.S. PATENT DOCUMENTS

| | | |
|---|---|---|
| 6,422,342 B1 | 7/2002 | Armstrong et al. |
| 7,059,648 B2 | 6/2006 | Livingston |
| 7,530,619 B1 | 5/2009 | Bruford et al. |
| 7,673,922 B1 | 3/2010 | Grimes |
| 8,505,944 B2 | 8/2013 | Genest et al. |
| 2015/0336622 A1 | 11/2015 | Worden et al. |

*Primary Examiner* — D Glenn Dayoan
*Assistant Examiner* — Melissa A Black
(74) *Attorney, Agent, or Firm* — Jason Rogers; King & Schickli, PLLC

(57) ABSTRACT

A tailgate assembly includes a tailgate and a step subassembly having a rail, a step carried on the rail and a pivot subassembly connecting the rail to the tailgate. That pivot subassembly includes two pivot pins. A molding is also carried on the rail.

20 Claims, 10 Drawing Sheets

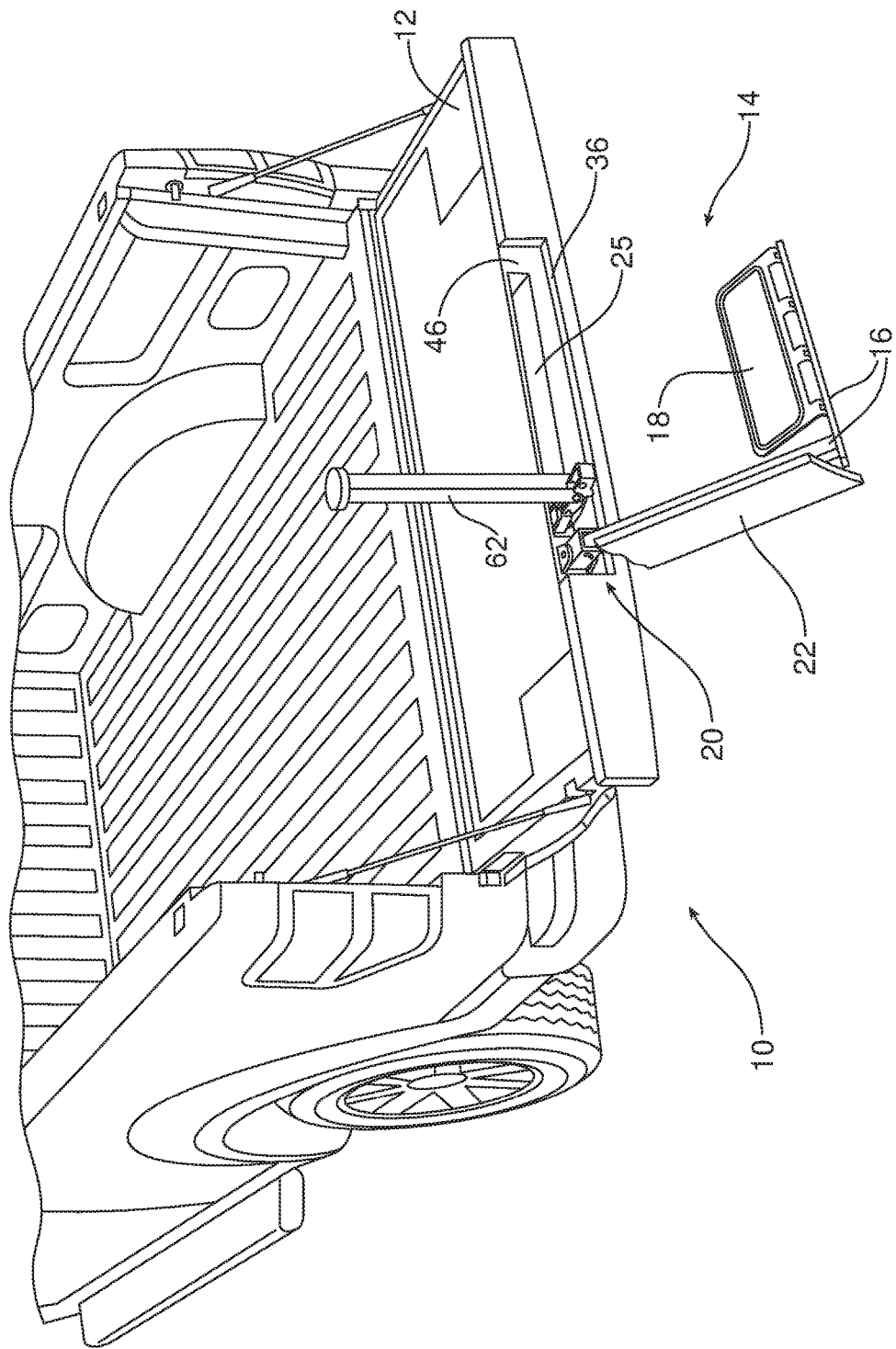

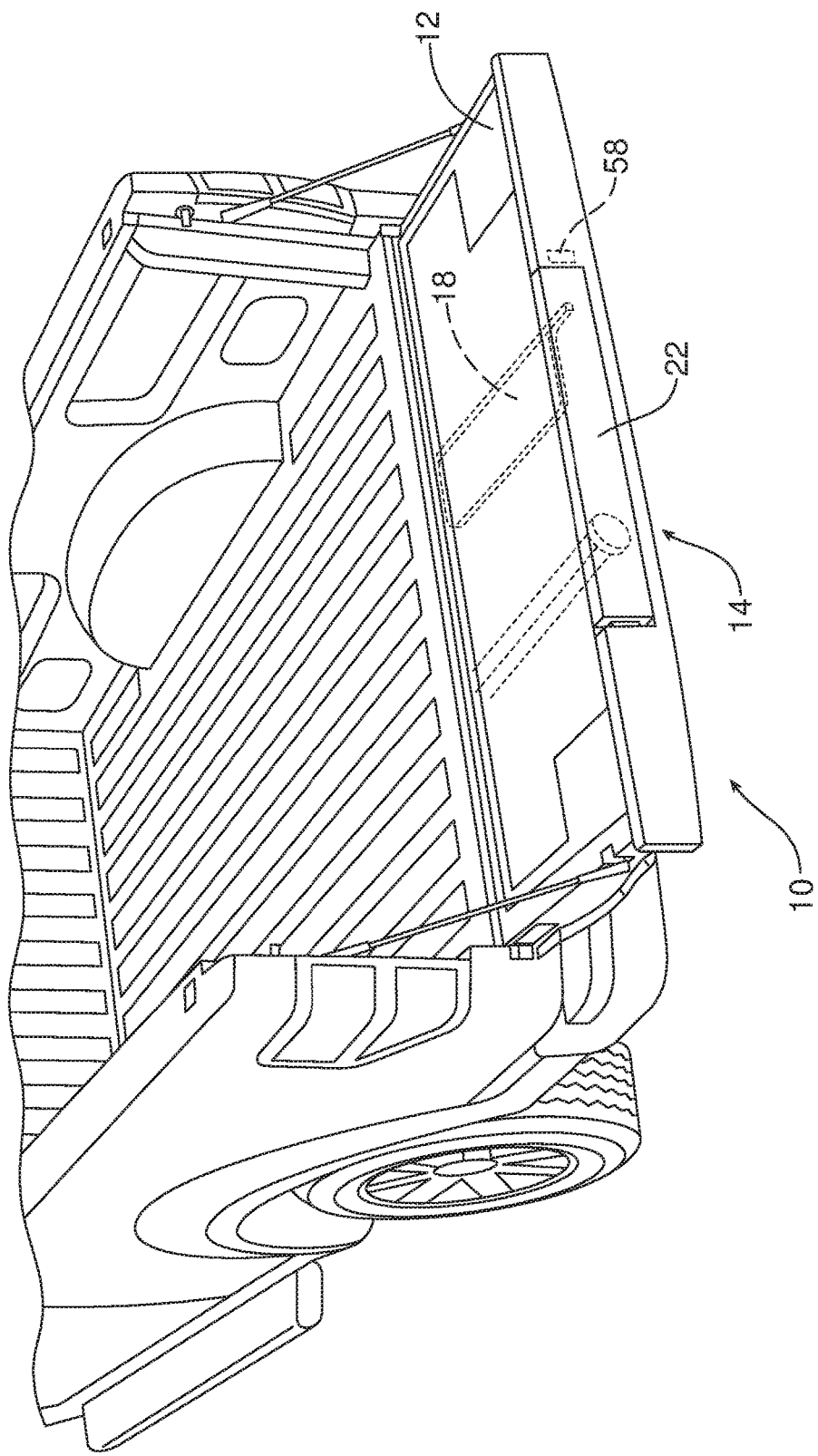

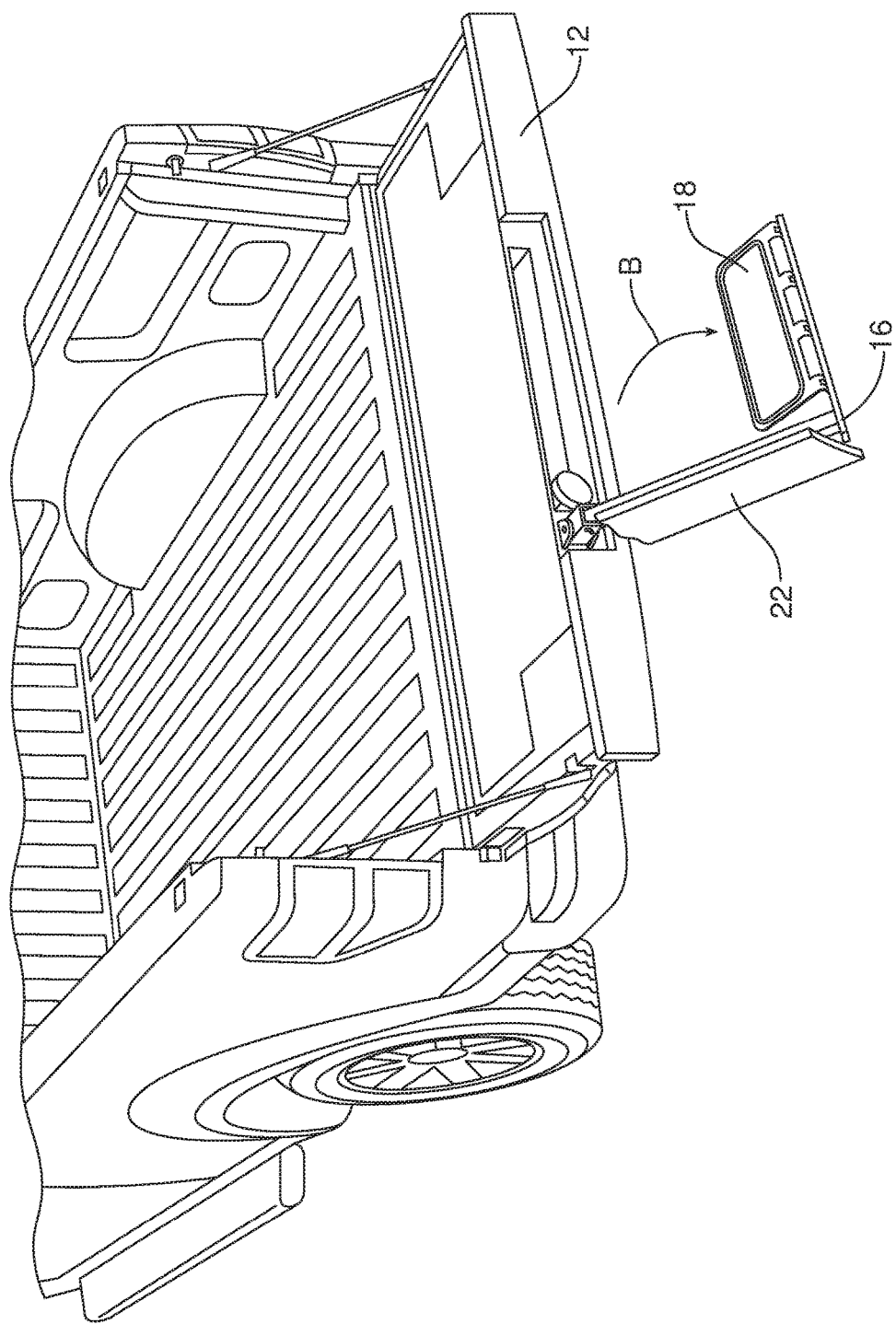

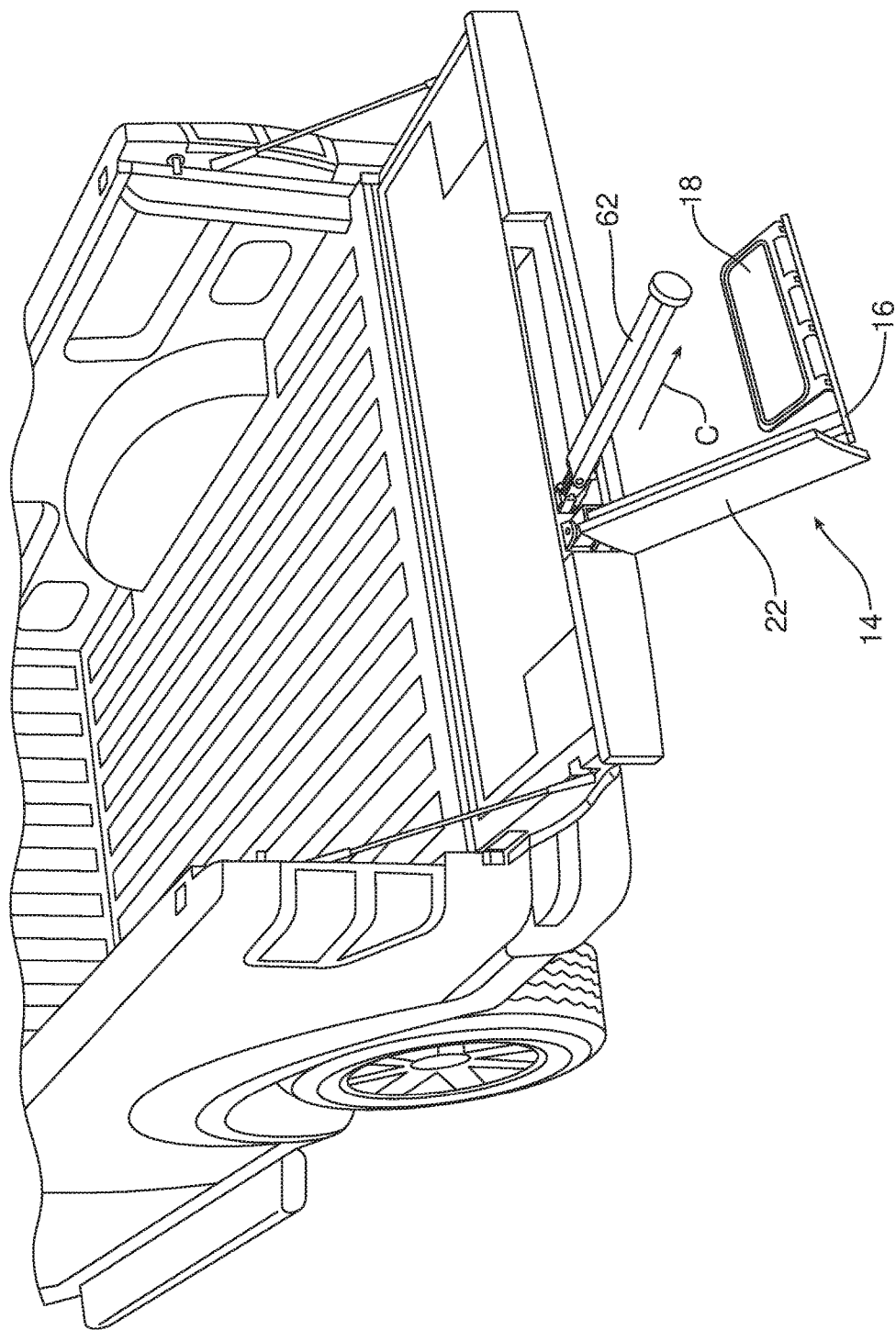

US 10,183,623 B2

TAILGATE ASSEMBLY WITH DEPLOYABLE CANTILEVERED STEP

TECHNICAL FIELD

Figure 2B:
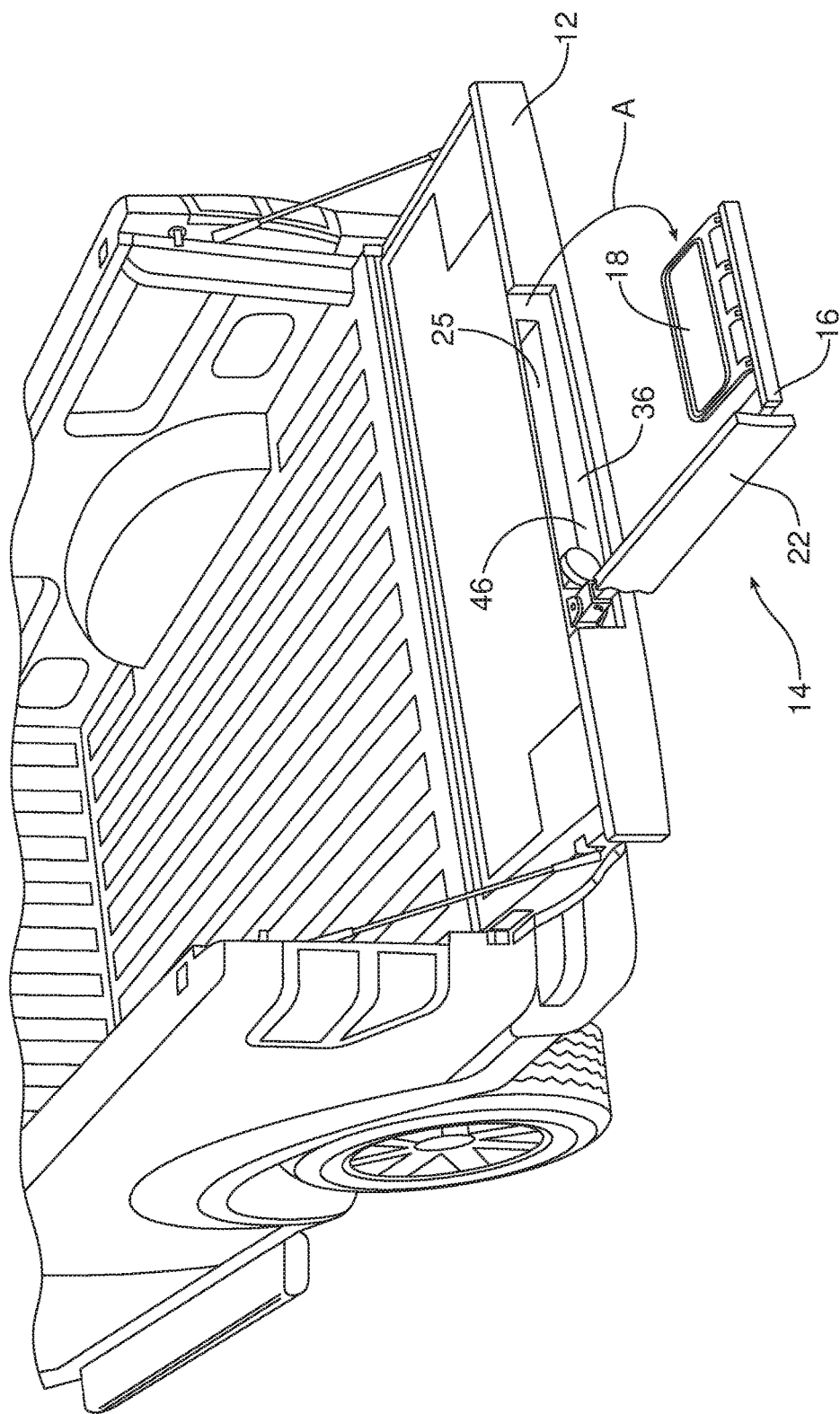
Figure 2E:
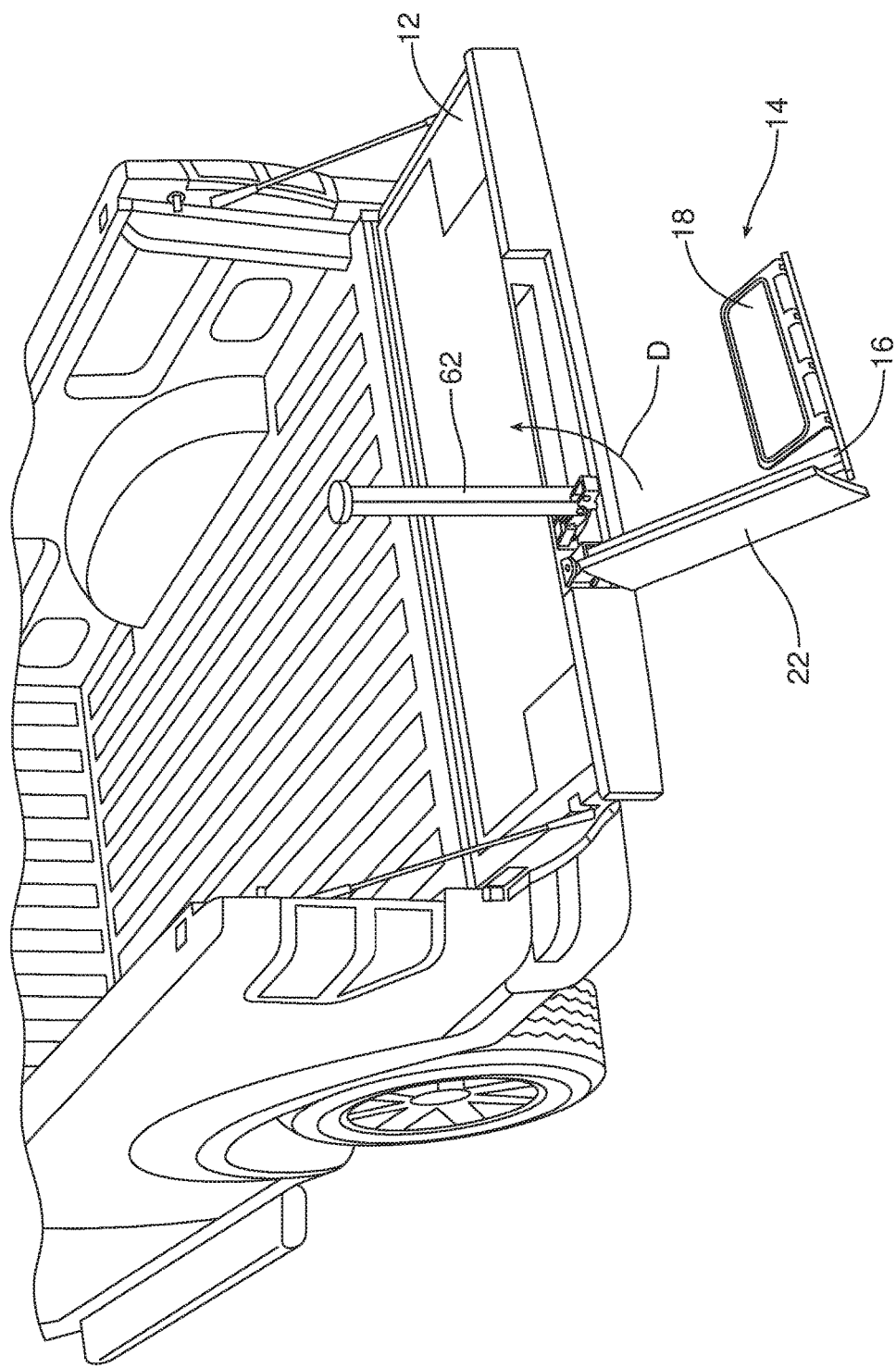

This document relates generally to the motor vehicle equipment field and, more particularly, to a new and improved tailgate assembly incorporating a lightweight and easy-to-deploy cantilevered step.

BACKGROUND

It is well known in the art to provide a tailgate of a motor vehicle with a deployable step which may be utilized to more easily access the cargo bed of the motor vehicle when the tailgate is open and the step is deployed. One example of such a structure is disclosed in U.S. Pat. No. 9,302,719, assigned to Ford Global Technologies, LLC of Dearborn, Mich.

This document relates to a tailgate assembly incorporating a step subassembly with a cantilevered step. The tailgate subassembly with the deployable cantilevered step is simpler in design, less expensive to produce, lighter in weight and functionally easier to utilize than prior step gate designs.

SUMMARY

In accordance with the purposes and benefits described herein, a tailgate assembly is provided. That tailgate assembly comprises a tailgate and a step subassembly. The step subassembly includes a rail, a step carried on the rail and a pivot subassembly connecting the rail to the tailgate. In addition, the tailgate assembly includes a molding that is carried on the rail. The step subassembly is displaceable between (a) a stowed position wherein the step is contained within the tailgate and concealed by the molding and (b) a deployed position wherein the step is extended from the tailgate for use.

The rail may be substantially L-shaped. Thus, the rail may include a first leg extending along a first axis and a second leg extending along a second axis. The molding may be carried on the first leg and the step may be carried on the second leg. In some embodiments, the first leg is substantially perpendicular to the second leg. The pivot subassembly may connect a proximal end of the first leg to the tailgate. In such a construction, the distal end of the first leg may be connected to a first end of the second leg. The second leg may have a length $L_1$ and the step may have a length $L_2$ where $L_1 > L_2$. In addition, the second end of the second leg may extend beyond the step. Further, the molding may extend along the first axis beyond the distal end of the first leg.

The pivot subassembly may include a first pivot pin extending along a first pivot axis and a second pivot pin extending along a second pivot axis. The first pivot axis may be offset and perpendicular to the second pivot axis.

Further, the pivot subassembly may include a base secured to the tailgate, a yoke carried on the base, a receiver pivotally connected to the yoke by the first pivot pin and a guide slot in the receiver. The second pivot pin may connect the rail to the receiver. In addition, a guide pin may be provided on the rail. That guide pin is received in the guide slot. The guide pin functions in conjunction with the guide slot to limit the arc about which the step subassembly may be pivoted about the second pivot pin thereby ensuring that when fully deployed, the step is oriented in a proper position for accessing a cargo bed of the motor vehicle to which the tailgate assembly is connected.

In accordance with an additional aspect, a tailgate assembly is provided that comprises a tailgate, a step subassembly and a pivot subassembly. That pivot subassembly connects the step assembly to the tailgate. The pivot subassembly includes a first pivot pin extending along a first pivot axis and a second pivot pin extending along a second pivot axis. The first pivot axis may be offset from and perpendicular to the second pivot axis.

The pivot subassembly may also include a base secured to the tailgate and a receiver pivotally connected to the base by the first pivot pin. The second pivot pin may pivotally connect the step subassembly to the receiver. In addition, a guide slot may be provided in the receiver and a guide pin may be provided on the step subassembly. The guide pin is received and held in the guide slot and functions as a stop when the step is fully deployed to ensure proper orientation of the step for use by an operator in accessing the load bed of the motor vehicle to which the tailgate assembly is connected.

In the following description, there are shown and described several preferred embodiments of the tailgate assembly. As it should be realized, the tailgate assembly is capable of other, different embodiments and its several details are capable of modification in various, obvious aspects all without departing from the tailgate assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the tailgate assembly and together with the description serve to explain certain principles thereof. In the drawing figures:

FIG. 1 is a perspective view illustrating the tailgate assembly with the step subassembly thereof in a fully deployed position so that the step is extended from the tailgate for use.

FIGS. 2*a*-2*e* are a series of illustrations showing how the step subassembly is displaced between (a) a stowed position wherein the step is contained within the tailgate and concealed by a molding and (b) a deployed position wherein the step is extended from the tailgate for use.

Figure 3A:
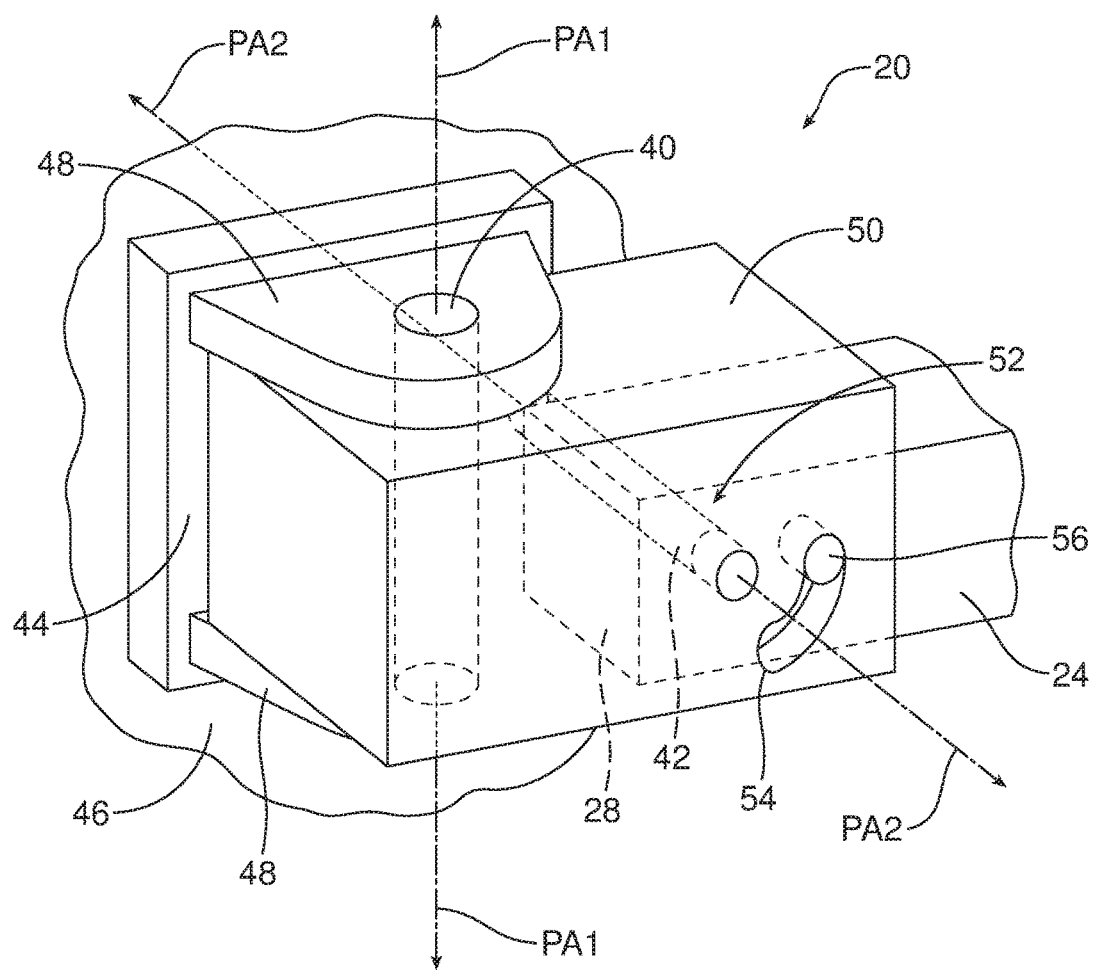
Figure 3B:
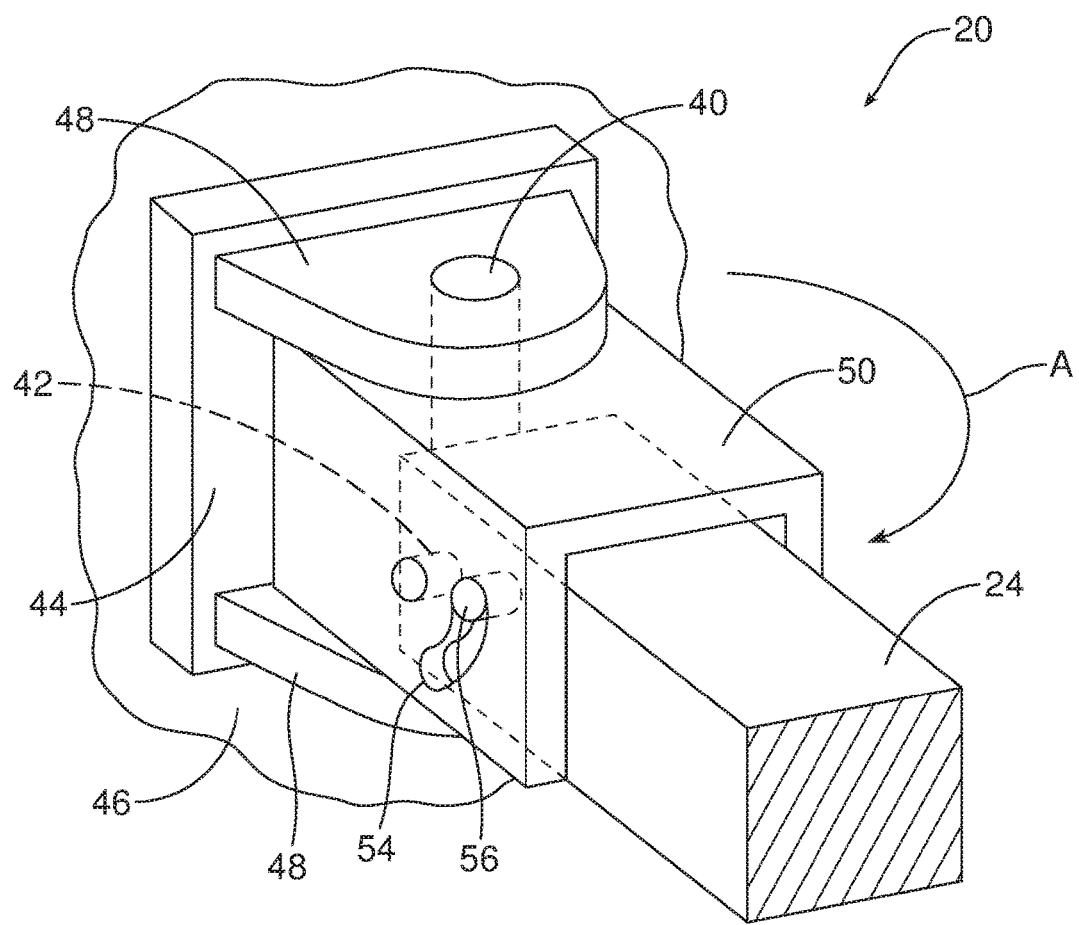
Figure 3C:
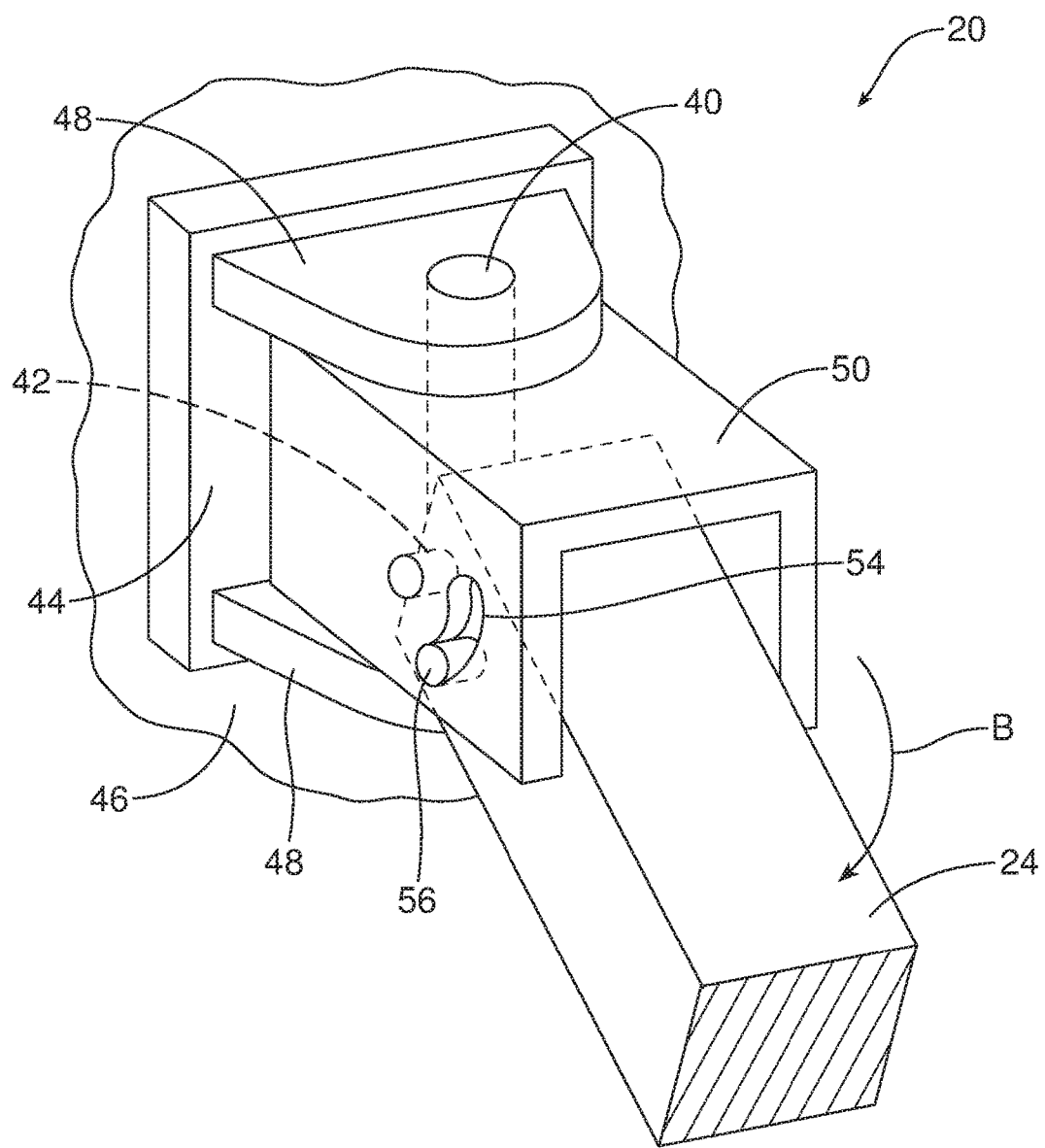

FIGS. 3*a*-3*c* are a series of illustrations showing in detail the positions and operation of the pivot subassembly that connects the step to the tailgate. FIG. 3*a* shows the position of the pivot subassembly when the step is in the stowed position. FIG. 3*b* shows the position of the pivot subassembly when the step is in the partially deployed position. FIG. 3*c* shows the pivot subassembly when the step is in the fully deployed position.

Figure 4:
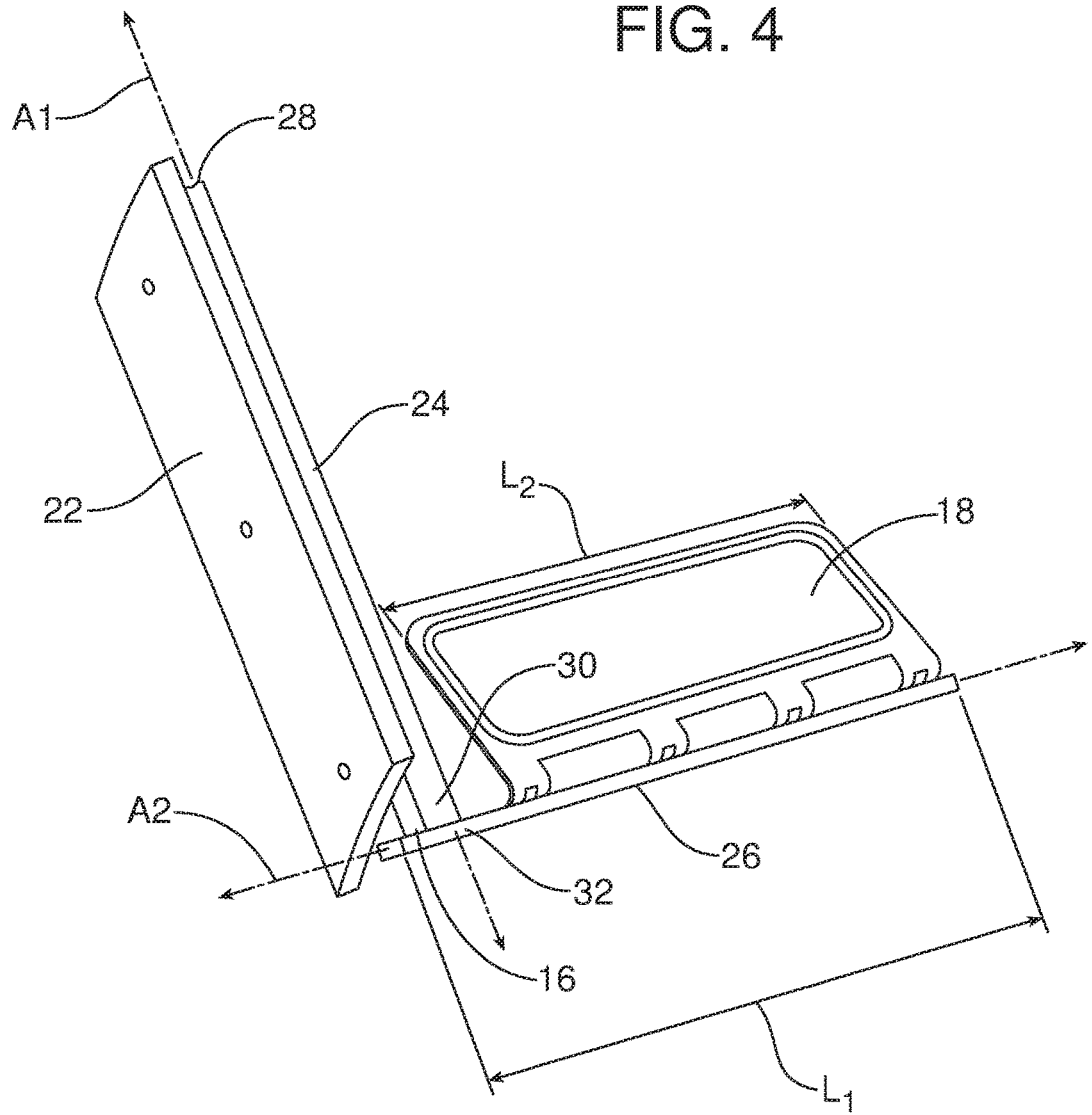

FIG. 4 is a detailed perspective view of the step subassembly and illustrates how the molding is carried on a first leg of the rail while the step is carried on a second leg of the rail.

Reference will now be made in detail to the present preferred embodiments of the tailgate assembly, examples of which are illustrated in the accompanying drawing figures.

DETAILED DESCRIPTION

Reference is now made to FIGS. 1-4 illustrating the tailgate assembly 10. As illustrated in FIG. 1, the tailgate assembly 10 includes a tailgate 12 and a step subassembly 14. The step subassembly 14 includes a rail 16, a step 18 carried on the rail and a pivot subassembly, generally designated by reference numeral 20, that connects the rail to the tailgate. A molding 22 is carried on the rail 16. As will become apparent from the following description, the step subassembly 14 is displaceable between a stowed position, illustrated in FIG. 2a, wherein the step 18 is contained within a compartment 25 within the tailgate 12 where it is concealed by the molding 22 and a deployed position, illustrated in FIGS. 1 and 2e wherein the step is extended from the tailgate for use.

In the illustrated embodiment, the rail 16 is substantially L-shaped and includes a first leg 24 and a second leg 26 (See FIG. 4). The first leg 24 extends along a first axis A1 while the second leg 26 extends along a second axis A2. The molding 22 is carried on the first leg 24 while the step 18 is carried on the second leg 26. In the illustrated embodiment, the first leg 24 and the first axis A1 are substantially perpendicular to the second leg 26 and the second axis A2.

The pivot subassembly 20 connects a proximal end 28 of the first leg 24 to the tailgate 12. A distal end 30 of the first leg 24 is connected to a first end 32, of the second leg 26. In the illustrated embodiment, the second leg 26 has a length $L_1$ and the step 18 has a length $L_2$ where $L_1>L_2$. It should also be appreciated that the second end 34 of the second leg 26 extends beyond the step 18. In addition, the molding 22 extends along the first axis A1 beyond the distal end 30 of the first leg 24 so that the molding 22 is of sufficient length to close the access opening 36 to the internal compartment 25 of the tailgate 12 when the step subassembly 14 is in the stowed position (See FIG. 2a).

As best illustrated in FIGS. 3a-3c, the pivot subassembly 20 includes a first pivot pin 40 extending along a first pivot axis PA1 and a second pivot pin 42 extending along a second pivot axis PA2. In addition, the pivot subassembly 20 includes a base 44 secured to the end 46 of the tailgate 12. A yoke 48 is carried on the base 44. The pivot subassembly 20 also includes a receiver 50 that is pivotally connected to the yoke 48 by the first pivot pin 40. The receiver 50 forms a trunnion 52 allowing the proximal end 28 of the first leg 24 of the rail 16 to be connected thereto by means of the second pivot pin 42.

In addition, the receiver 50 includes an arcuate guide slot 54. Further, the first leg 24 of the rail 16 includes a guide pin 56 that is received in and slides along the guide slot 54. As will be appreciated from the following description, the guide pin 56 functions with the guide slot 54 to limit the arc about which the step 18 may be pivoted about the pivot pin 42 thereby ensuring that the step is properly oriented for use when it is in the fully deployed position shown in FIGS. 1 and 2c-2e.

Reference is now made to FIGS. 2a-2e which illustrate how the tailgate assembly 10 operates. As illustrated in FIG. 2a, the step subassembly 14 is in the stowed position with the step 18 concealed behind the molding 22 within the internal compartment 25 of the tailgate 12. As should be appreciated, the molding 22 extends fully across the access opening 36 in the tailgate 12 and provides an aesthetically pleasing appearance. The molding 22 also effectively seals the access opening 36 and the internal compartment 25 from rain, water and ice intrusion by extending around the lip or end face 46 of the tailgate 12. FIG. 3a illustrates the position of the pivot subassembly 20 when the step assembly 14 is in the stowed position.

When one wishes to deploy the step subassembly 14, one releases the latch 58, schematically illustrated in FIG. 2a, that secures the step subassembly 14 in the stowed position. Once the latch 58 has been released, the step subassembly 14 is partially deployed by pivoting (note action arrow A) the rail 16 about the first pivot pin 40 through approximately 90 degrees about the first pivot axis PA1. FIG. 2b shows the step subassembly 14 in the resulting partially deployed position with the rail 16 extending in a horizontal direction from the tailgate 12. FIG. 3b illustrates the position of the pivot subassembly 20 when the step assembly 14 is in the partially deployed position.

Next the step subassembly 14 is displaced into the fully deployed position by pivoting the rail 16 downward in the direction of action arrow B through an arc of approximately 1-60 degrees as determined by the arcuate guide slot 54 until the step 18 is in the fully deployed position and oriented for use. (Note this pivoting action takes place about the second pivot axis PA2.) As illustrated in FIG. 3c, the guide pin 56 engages the end of the arcuate guide slot 54 once the step 18 is fully deployed so as to hold the step in this fully deployed position.

Following the full deployment of the step subassembly 14 as illustrated in FIG. 2c, one may deploy the safety handle 62. The safety handle 62 may be pivotally connected to the tailgate 12 in a manner known in the art. Thus, the safety handle 62 may first be pulled outwardly from the tailgate 12 in the direction of action arrow C as illustrated in FIG. 2d. Next, the safety handle 62 may be pivoted upwardly (note action arrow D) and locked into the final use position illustrated in FIG. 2e.

In summary, the tailgate assembly 10 provides a number of benefits and advantages. The tailgate assembly 10 incorporates a step subassembly 14 including a single rail 16 and a step 18 that is cantilevered to that rail. In contrast, prior art step gates have incorporated steps supported between two rails. Advantageously, the single rail design requires less material and is less expensive to produce. In fact, the rail 16 and the step 18 may be integrally formed from a single piece of material. This not only reduces production costs but also reduces the weight of the step subassembly 14 and, therefore, the weight of the overall tailgate assembly 10. This allows one to more easily and conveniently manipulate the tailgate 12 and step subassembly 14 during use.

It should also be appreciated that the cantilevered step 18 is open at one end making it easier to use. Further, while the useable width of a prior art tailgate step is limited by the thickness of the tailgate since the step extends at right angles between the walls of the tailgate, the step 18 of the present invention is contained and held within the internal compartment 25 at an acute angle which allows the width dimension of the step to be increased for the user's benefit.

It should also be appreciated that the molding 22 of the step subassembly 14 is mounted to the first leg 24 of the rail 16 away from the step 18 that is mounted to the second leg 26 of the rail. Thus, the molding 22 is protected from being stepped on when a user utilizes the step 18. In contrast, the molding in prior art step gates is secured to the bottom of the step where a user might accidentally roll his weight upon the molding, occasionally disengaging or possibly even damaging the molding.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A tailgate assembly, comprising:
a tailgate;
a step subassembly including a rail, a step cantilevered to said rail and a pivot subassembly connecting said rail to said tailgate; and
a molding carried on said rail wherein said step subassembly is displaceable between (a) a stowed position wherein said step is contained within said tailgate and concealed by said molding and (b) a deployed position wherein said step is extended from said tailgate.

2. The tailgate assembly of claim 1, wherein said rail is L-shaped.

3. The tailgate assembly of claim 1, wherein said rail includes a first leg extending along a first axis and a second leg extending along a second axis.

4. The tailgate assembly of claim 3, wherein said molding is carried on said first leg.

5. A tailgate assembly, comprising:
a tailgate;
a step subassembly including a rail, a step carried on said rail and a pivot subassembly connecting said rail to said tailgate; and
a molding carried on said rail wherein said step subassembly is displaceable between (a) a stowed position wherein said step is contained within said tailgate and concealed by said molding and (b) a deployed position wherein said step is extended from said tailgate;
said tailgate assembly being characterized by (a) said rail including a first leg extending along a first axis and a second leg extending along a second axis, (b) said molding being carried on said first leg, (c) said step being carried on said second leg and (d) said first leg being substantially perpendicular to said second leg.

6. The tailgate assembly of claim 5, wherein said first leg is substantially perpendicular to said second leg.

7. The tailgate assembly of claim 5, wherein said pivot subassembly connects a proximal end of said first leg to said tailgate.

8. The tailgate assembly of claim 7, wherein a distal end of said first leg is connected to a first end of said second leg.

9. The tailgate assembly of claim 8, wherein said second leg has a first length $L_1$ and said step has a second length $L_2$ where $L_1 > L_2$.

10. The tailgate assembly of claim 9, wherein a second end of said second leg extends beyond said step.

11. The tailgate assembly of claim 10, wherein said molding extends along said first axis beyond said distal end of said first leg.

12. The tailgate assembly of claim 5, wherein said pivot subassembly includes a first pivot pin extending along a first pivot axis and a second pivot pin extending along a second pivot axis.

13. The tailgate assembly of claim 12, wherein said first pivot axis is offset from and perpendicular to said second pivot axis.

14. The tailgate assembly of claim 13, wherein said pivot subassembly includes a base secured to said tailgate, a yoke carried on said base, a receiver pivotally connected to said yoke by said first pivot pin, and a guide slot in said receiver, said second pivot pin connecting said rail to said receiver.

15. The tailgate assembly of claim 14, further including a guide pin on said rail received in said guide slot.

16. A tailgate assembly, comprising:
a tailgate;
a step subassembly including a cantilevered step; and
a pivot subassembly connecting said step subassembly to said tailgate, said pivot subassembly including a first pivot pin extending along a first pivot axis and a second pivot pin extending along a second pivot axis.

17. The tailgate assembly of claim 16, wherein said first pivot axis is offset from and perpendicular to said second pivot axis.

18. The tailgate assembly of claim 17, wherein said pivot subassembly includes a base secured to said tailgate and a receiver pivotally connected to said base by said first pivot pin.

19. The tailgate assembly of claim 18, wherein said second pivot pin pivotally connects said step subassembly to said receiver.

20. The tailgate assembly of claim 19, further including a guide slot in said receiver and a guide pin on said step subassembly that is received and held in said guide slot.

* * * * *